(12) United States Patent
Villaret

(10) Patent No.: US 6,573,679 B1
(45) Date of Patent: Jun. 3, 2003

(54) SERVOMECHANICAL CONTROL SYSTEM AND METHOD

(75) Inventor: Yves Villaret, Hadera (IL)

(73) Assignee: Yaskawa Eshed Technology Ltd., Rosh Ha'ayin (IR)

( * ) Notice: Subject to any disclaimer, the term of this patent is extended or adjusted under 35 U.S.C. 154(b) by 0 days.

(21) Appl. No.: 09/857,023

(22) PCT Filed: Dec. 2, 1999

(86) PCT No.: PCT/IL99/00653

§ 371 (c)(1),
(2), (4) Date: May 31, 2001

(87) PCT Pub. No.: WO00/33145

PCT Pub. Date: Jun. 8, 2000

(30) Foreign Application Priority Data

Dec. 2, 1998 (IL) .................................................. 127370

(51) Int. Cl.$^7$ ............................................. G05B 11/01
(52) U.S. Cl. .................. 318/560; 318/568.22; 318/609; 318/610
(58) Field of Search ........................... 318/568.22, 609, 318/610, 560

(56) References Cited

U.S. PATENT DOCUMENTS

| | | | | |
|---|---|---|---|---|
| 4,396,975 A | * | 8/1983 | Kurakake | 364/161 |
| 5,134,354 A | * | 7/1992 | Yamamoto et al. | 318/609 |
| 5,184,055 A | * | 2/1993 | Ohishi et al. | 318/615 |
| 5,764,017 A | * | 6/1998 | Bauck | 318/610 |

* cited by examiner

*Primary Examiner*—Robert E. Nappi
*Assistant Examiner*—Rina I. Duda
(74) *Attorney, Agent, or Firm*—Edward Langer, Pat. Atty.; Shiboleth, Yisraeli, Roberts, Zisman & Co.

(57) ABSTRACT

An improved method for controlling a servomechanism, applicable to nearly all types of servomechanism control systems. The inventive method improves the performance of servomechanism control systems which utilize a digital feedback sensor by enabling the gain to be varied. The variable gain allowed by the inventive method enables tighter control, and better performance.

14 Claims, 3 Drawing Sheets

SERVOMECHANICAL CONTROL SYSTEM AND METHOD

FIELD OF THE INVENTION

The present invention relates to servomechanisms and control systems, and more particularly, to a novel servomechanism control system and method featuring automatic servo loop parameter adjustment during movement, according to speed and position tracking error information.

BACKGROUND OF THE INVENTION

In the past few years, motor drive technology has switched from analog to digital control, and this change in the design approach achieves better noise immunity, and allows implementation of sophisticated drives for AC and DC motors at lower cost. Closed-loop servomechanism control systems applied to electrical motors are arranged as a feedback loop which comprise certain basic elements, including an error detector, which generates an error signal representing the difference between the command signal and the controlled output, and a controller, which amplifies the error signal. The error detection is based on use of a feedback sensor which is used to measure the state of the system, and feed the value back to the control system. For example, in the case of electrical motor control, a position feedback device mounted on the motor shaft provides position information. Another approach to motor control relates to control of the electrical current. Many other control systems can be designed using this approach.

Transient analysis of servomechanism control systems provides a definition of certain basic concepts regarding system performance, and PID (proportional-integral-derivative) control is based on these concepts. The typical issues affecting design of these systems relate to the speed of response to disturbances in a closed-loop feedback system, the amount of overshoot which can be tolerated, and the steady state error which obtains after the system has reached equilibrium.

In any servomechanism control system design, the introduction of PID control presents constraints on the achievement of good speed of response, while minimizing offshoot, and avoiding oscillations which cause system instability. Thus, achieving a well-designed servomechanism control system becomes a complicated goal when considering the need to simultaneously achieve accurate, automatic, continous and instantaneous performance. The tightness of control is the goal, and the methods of achieving it include raising the amplitude of the response to a given error, which achieves more rapid response, but with this comes the oscillation problem.

Therefore, it would be desirable to provide a method which improves the tightness of control for servomechanisms, without unduly complicating the apparatus and its operation.

SUMMARY OF THE INVENTION

Accordingly, it is a principal object of the present invention to overcome prior art problems associated with PID control of servomechanisms and the speed of response, and provide an improved method for controlling a servomechanism.

In accordance with the present invention, there is provided an improved method of controlling a servomechanism, said method comprising the steps of:

generating a command signal representing a desired physical quantity;

actuating a driven element to output said physical quantity in accordance with said command signal;

measuring said output physical quantity and comparing it with said command signal;

generating an error signal representing the difference between said command signal and said meaured output; and providing said error signal in a feedback loop having a variable gain to actuate said driven element in a fashion so as to reduce said error signal to a zero value, wherein said variable gain is provided in accordance with a function related to the absolute value of said error signal and the absolute value of the velocity of said command signal.

The inventive method is applicable to nearly all types of servomechanism control systems. In general application, it is useful to control the state of a system, using an actuator, which provides a means of changing the state of the system, and a feedback sensor, which provides a means to measure the state of the system, to provide a feedback value to the control system. Examples of these types of systems include servomechanism control of an electrical motor with a position feedback device mounted on the shaft; a machine activated by a hydraulic piston with a position feedback device; control of the electrical current in an electrical motor; control of the water level in a boiler; control of aeronautical equipment such as aircraft wing flap position systems, valve control in chemical process plants, etc.

The inventive method is applicable in all of these types of systems to reduce the tracking error, i.e., the difference between the desired state and the actual state of the controlled variable. It also increases the speed of response, reducing the time necessary for the system to reach a new state value within a given precision. Further, it increases control tightness, i.e., it reduces the tracking error induced by external perturbations.

A feature of the inventive method is its ability to improve the performance of servomechanism control systems which utilize a digital feedback sensor. Unlike with prior art systems, which have limited gain when using a digital feedback sensor, the inventive method enables the gain to be varied, by raising it only when necessary, such as when a perturbation occurs, or when the the speed is increased.

For example, in prior art systems, such as a position control system using an electrical motor with an optical encoder, the discrete nature of the encoder reduces the maximum loop gain of the system at very low speeds. At low speeds, the speed sensing based on the encoder is not accurate, and raising the loop gain produces strong vibrations around the equilibrium position. The inventive method allows for a variable gain, thus enabling tighter control.

Other features and advantages of the invention will become apparent from the following drawings and the description.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF A PREFERRED EMBODIMENT

Figure 1:
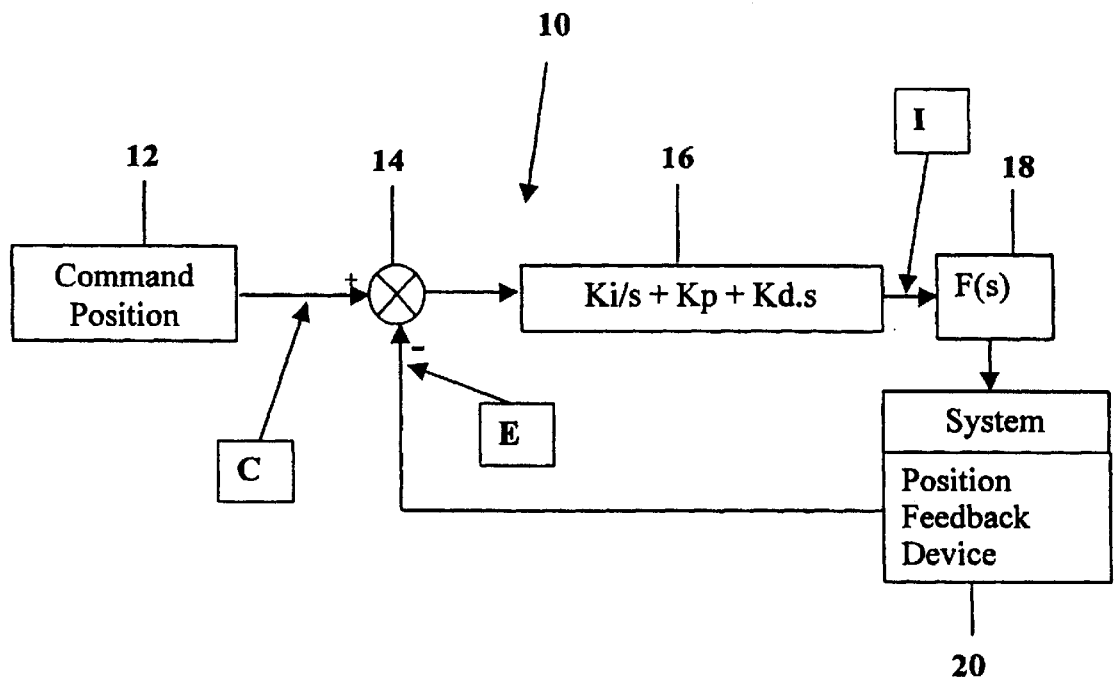
FIG. 1 is a schematic block diagram of a simplified servomechanism control system.

Referring now to FIG. 1, there is shown a schematic block diagram of a simplified servomechanism control system 10, for example, in an application providing position control using an electric motor as the system actuator. Control system 10 comprises a closed-loop feedback system having a command position generator 12, an error detector 14, a controller 16, an actuator 18, and a position feedback device 20. The controller 16 is shown with a control equation written in the form of a PID control loop, expressed as a Laplace transform. The control variables (C, E, I) which are shown in FIG. 1, together with the control variables (not shown) which may be calculated (Vc, $\epsilon$), are defined as follows:

C Command position, which is the position the system is instructed to reach.

Vc Command speed, which is the velocity of the position command.

E Actual position, which is the present position of the system, such as the shaft angle of an electrical motor.

$\epsilon$ Position error=(Command Position)−(Actual Position)

I Feedback actuator value (e.g., current of an electrical motor)

In most conventional systems, control equations can be written in the PID control loop form as follows:

$$I=Ki*\int \epsilon dt+Kp*\epsilon+Kd*d\epsilon/dt \qquad (1)$$

Many variations, additions and more elaborate algorithms exist, with most having the same basic parameters defined (the PID coefficients):

Ki Integral Feedback Coefficient

Kp Proportional Feedback Coefficient

Kd Differential Feedback Coefficient

In many cases the equations are written in a different format, but by mathematical transformation they can be written in the same way, sometimes with additional terms. A common technique of expressing the equation uses the Laplace Transform, in which F(s) represents the transfer function of the physical system, as shown in FIG. 1.

In accordance with the principles of the present invention, the improved method of servomechanism control utilizes the same form of the equation (1), but the parameters of the equation are adjusted in a specific way, as described further herein.

In order to describe the algorithm utilized in the improved method of control per the invention, the following portion of the description provides definitions for the control variables, their relationships and effect upon the improved control method.

1) Kg is defined as a variable used to change the gain of the control loop. This variable affects the gain of the PID equation (1). In the inventive method, this variable is a combined function of position error and of command speed. At command speed zero and position error zero, Kg=1, i.e. the PID coefficients are not changed. During movement, the command speed and position error values increase. Kg will then be changed to an increased value which will cause the system to respond strongly in order to reduce position error.

2) t_KgPar is defined as a coefficient setting the rate of change of Kg with the absolute value of position error. This coefficient is given a fixed value for a given system, and it defines the relationship between Kg and the position error.

3) nKd is defined as the coefficient setting the rate of change of Kg with the command speed. This coefficient is given a fixed value for a given system, and it defines the relationship between Kg and the absolute value of the command speed.

4) MinSpeed is defined as a speed threshold parameter. This coefficient is given a fixed value for a given system, and it defines the relationship of Kg and the command speed. When the command speed is well under the given fixed value, Kg is independent of the command speed. When the command speed exceeds that value, Kg increases progressively with the absolute value of the command speed.

5) MaxKg is defined as an upper limit for Kg. Variation of Kg with the command speed and position error is limited to that maximum value.

6) KgFilter is defined as a parameter for filtering Kg, when Kg is decreasing. In order to avoid discontinuity of the feedback response, a low pass time filter is applied on Kg when the Kg value is decreasing. No filter is applied when Kg is increasing.

With the above definitions, the following equation can be presented in accordance with the inventive control method, representing the amount of feedback applied to the servomechanism control system (herein: Integral feedback)

$$I=\text{Integral}+Kp.Kg^2.\epsilon+Kd.Kg.d\epsilon/dt \qquad (2)$$

where Integral is defined as follows:

$$\text{Integral}(t+dt)=\text{Integral}(t)+dt.Kii.Kg.Kg\epsilon+dt.Kip.Kg.Kg.d\epsilon/dt \qquad (3)$$

Kii and Kip are defined as follows: (where $|\epsilon|$ represents the absolute value of $\epsilon$)

If $(|\epsilon|>0)$ and $(d|\epsilon|/dt >0)$, then [Kii=Kis, Kip=Kiv]
Otherwise [Kii=Ki, Kip=0].

Kg is calculated by the following formula: Initial value of Kg,
$$Kg=1 \qquad (4)$$

$$TKg=f(|\epsilon|, |Vc|) \qquad (5)$$

where f is a growing function of the absolute value of both the position error $|\epsilon|$ and the command speed $|Vc|$, with a finite maximum value, and a positive minimum value of 1. Many mathematical functions or tables of values conforming to these rules may be chosen for f, and for the preferred embodiment the following function was chosen:

$$Tkg1=\{nKd*abs|Vc|+\text{MinSpeed}\}/\{|Vc|+\text{MinSpeed}\}+t\_KgPar*|\epsilon| \qquad (6)$$

If $(Tkg>MaxKg)$, then $Tkg=MaxKg$ \qquad (7)

If $(Tkg>Kg)$ then $Kg=Tkg$ \qquad (8)

Otherwise, $Kg(t+dt)=Kg(t)+KgFilter*dt*(TKg-Kg(t))$ \qquad (9)

In accordance with the inventive control method, the above control equations (1)–(9) provide the following functions:

(1) Function of Kg

The feedback parameters are increased by Kg. At equilibrium, i.e., when the position error is small, and when the speed is low, smooth operation is generally required, and in such cases, it is desirable to limit the feedback gain, so as to avoid vibrations in the control system. Another reason for limiting the feedback gain at low speeds is that most servo control systems have non-linear behavior at steady state, due to friction, the digital nature of feedback devices, backlash of gears and other physical limitations. In many cases, these physical limitations limit the maximum feedback gain of the control system at steady state. However, during movement, a much higher feedback gain can be allowed.

In accordance with the principles of the inventive method, Kg makes it possible to change the gain during movement, and the specific combination of command speed and position error variables in the Kg formula (equations 4–9 above) provides a practical way of changing the gain without introducing oscillations in the control system.

Also, the value of Kg is raised to a different mathematical exponent for each feedback parameter, and this maintains the control loop stability for all Kg values in the range<MaxKg.

(2) Function of Kis, Kiv

In conventional systems, integral feedback is proportional to the position error integral. If the integral feedback gain is increased, then the problem of overshoot is present and system instability is obtained. In the scope of the present invention, it was observed that when position error is decreasing, the integral has reached a sufficient value to compensate the perturbations that caused the position error. However, in conventional systems, the integral term continues to grow, and when the position error finally returns to zero, the integral term has too large a value, and is the source of overshoot. This is the main reason that limits are placed on the integral feedback gain.

In accordance with the present invention, the integral feedback term grows strongly when the position error is growing, but grows slowly (or stops when Ki=0), when the position error is decreasing. This eliminates the causes of the overshoot, and thus the integral feedback gain can have a much larger value, as large as 10 times more.

Similarly, the inventive method applies this approach to the integral of the position error derivative (Kiv). Since the integral of the position error derivative is related to the position error, Kiv increases the so-called proportional feedback gain Kp without creating oscillations.

Figure 2A:
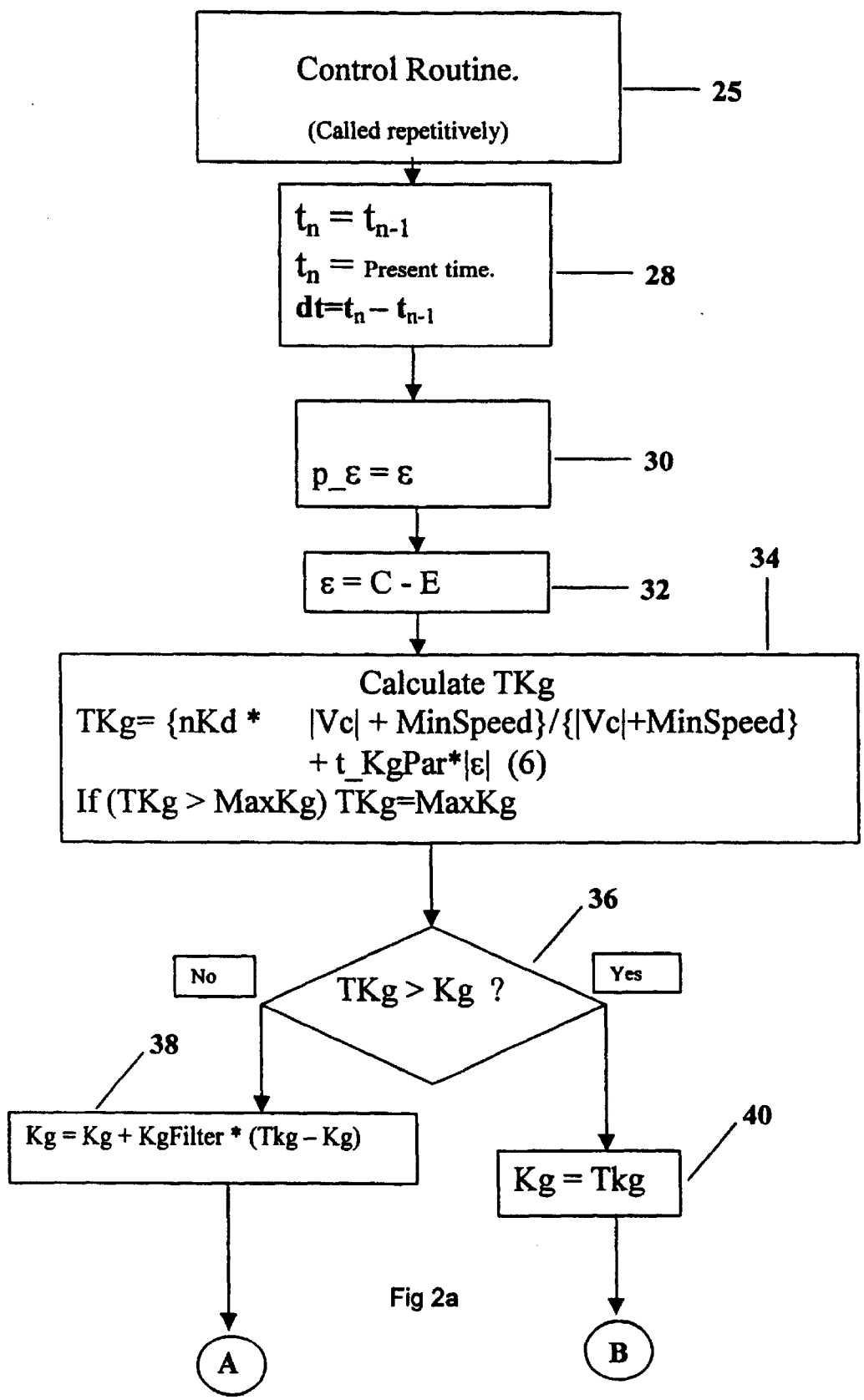
FIGS. 2a–b illustrate a flowchart of a method of controlling the system of FIG. 1 in accordance with the method of the present invention.
Figure 2B:
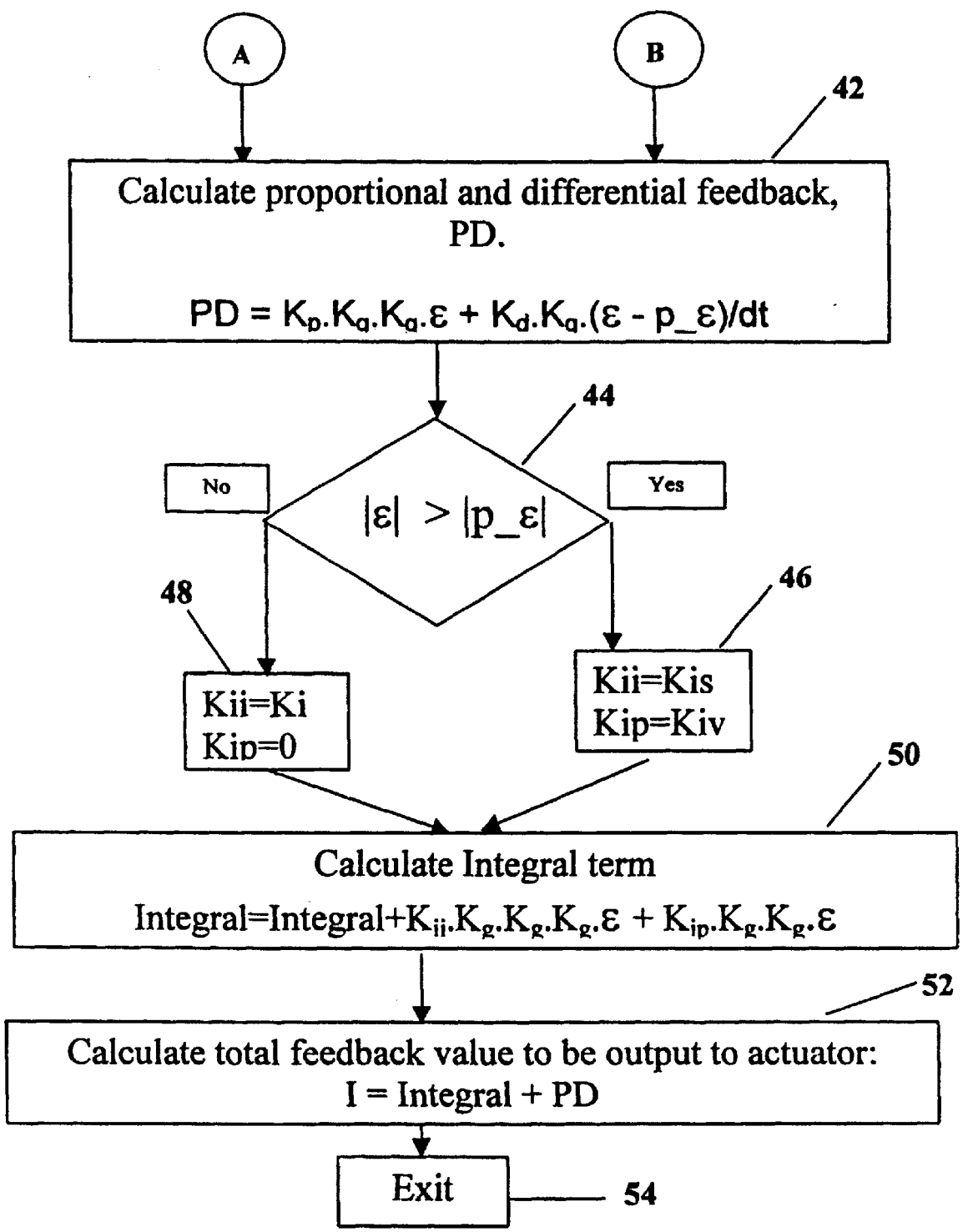

Referring now to FIGS. 2a–b, there is illustrated a flowchart of a method of controlling the system of FIG. 1 in accordance with the method of the present invention for example, in an application providing position control using an electric motor as the system actuator. In the preferred embodiment, the method is incorporated in a software control routine, which is typically run on a control hardware computer system, which may be implemented on an NEC V853 microprocessor chip, or other, in accordance with skill of the art software programming techniques.

The control routine described in FIGS. 2a–b is run on the control hardware, and in block 25, the control routine is called repetitively, typically by an interrupt or delay in order to call the routine at regular intervals. In block 28, the time interval between the present call and the last call of the control routine is calculated. Typically, if regular intervals are used, the variable dt can be set to a constant value.

In block 30, in order to calculate speed, the previous value of the position is stored in memory. In block 32, the present command position and system position are measured, and the difference is calculated, resulting in position error ε. These values of command postion and system position are read via interface devices, provided in the specific application, such as digital encoders.

In block 34, a target value for the gain factor (Kg) is calculated, using the formulas in equations (5) and (6). This formula increases the gain progressively with position error and command speed. In block 36, the target value for the gain is tested, and if the target value for gain is lower than the present one, a filter is applied to Kg in block 38. This leaves a higher gain for some time after a perturbation, thus giving the system more time to stabilize before lowering the gain back to its initial value.

If the block 36 test of the target value for gain shows that it is higher than the present one, in block 40 the gain immediately jumps to a high value in order to respond quickly and strongly to a detected perturbation. In block 42, the proportional and differential feedback is calculated in accordance with the formula shown. The proportional feedback is multiplied by the gain Kg at exponent 2, and the differential feedback is multiplied by the gain Kg.

In block 44, the position error is tested, to determine whether it is increasing or decreasing, and the control routine selects the values for the integral feedback parameters accordingly. If the position error is increasing, then in block 46, the feedback gain is increased, and a high value of the Integral feedback (equation (2)) is chosen.

If, however, the position error is decreasing, then this means that the Integral feedback has finally reached a value that will bring the system toward the command position. If the Integral feedback were to continue to grow, then when the system finally reaches the command position, the value of the Integral feedback would be too large, and an overshoot would be created. Thus, in block 48, a low value is selected for Kii and a zero value is selected for Kip.

In block 50, the Integral feedback is calculated per equation (2), and in this step, Kii is multiplied by Kg at exponent 3, and Kip is multiplied by Kg at exponent 2.

In block 52, the total calculated feedback is output to the system. In block 54, the end of the control routine is reached, and the routine is called again by the system software at the next time interval dt.

In alternative embodiment, the closed-loop feedback system may be implemented in an analog signal processor, in accordance with standard design techniques.

Having described the inventive method with regard to certain specific steps, it is to be understood that the description is not meant as a limitation, since further modifications may now suggest themselves to those skilled in the art, and it is intended to cover such modifications as fall within the scope of the appended claims.

What is claimed is:

1. An improved method of controlling a servomechanism, said method comprising the steps of:

generating a command signal representing a desired physical quantity;

actuating a driven element to output said physical quantity in accordance with said command signal;

measuring said output physical quantity and comparing it with said command signal;

generating an error signal representing the difference between said command signal and said meaured output; and providing said error signal in a feedback loop having a variable gain to actuate said driven element in a fashion so as to reduce said error signal to a zero value, wherein said variable gain is provided in accordance with a function related to the absolute value of said error signal and the absolute value of the velocity of said command signal.

2. The method of claim 1 wherein said feedback loop comprises elements representing differential feedback, proportional feedback and integral feedback.

3. The method of claim 2 wherein said variable gain is applied to said differential feedback element with an exponent of one in said feedback loop.

4. The method of claim 2 wherein said variable gain is applied to said proportional feedback element with an exponent of two in said feedback loop.

5. The method of claim 2 wherein said variable gain is applied to said integral feedback element with an exponent of three in said feedback loop.

6. The method of claim 1 wherein said variable gain function increases with said absolute value of said error signal and said absolute value of said command signal.

7. The method of claim 1 wherein said variable gain function increases with said absolute value of said error signal and said absolute value of said command signal, and has a finite maximum value and positive minimum value.

8. The method of claim 7 wherein said method is applied to a position control system in which said driven element is provided as a motor and said variable gain function is provided in accordance with the following equation:

$$Tkg1=\{nKd*abs|Vc|+\text{MinSpeed}\}/\{|Vc|+\text{MinSpeed}\}+t\_KgPar*|\epsilon|$$

where,

If $(Tkg>\text{Max}Kg)$, then $Tkg=\text{Max}Kg$ and where:
- Vc=Command speed, which is the speed of the position command
- MinSpeed=a speed threshold parameter
- MaxKg=an upper limit for Kg
- t_KgPar=a coefficient setting the rate of change of Kg with command speed
- $\epsilon$=Position error.

9. The method of claim 1 further comprising the step of filtering said variable gain function in asymmetric fashion by applying a low pass time filter to said variable gain when its value is decreasing, not when its value is increasing.

10. The method of claim 8 wherein said error signal comprises a position error and said feedback loop comprises an integral feedback element which is adjusted in accordance with a derivative of the absolute value of said position error signal, such that said integral feedback element has a relatively high value when said position error signal is increasing, and a relatively low value when said position error signal is decreasing.

11. The method of claim 8 wherein said error signal comprises a position error and said feedback loop comprises a velocity error integral feedback element which is adjusted in accordance with a derivative of the absolute value of said position error signal, such that said integral feedback element has a relatively high value when said position error signal is increasing, and a relatively low value when said position error signal is decreasing.

12. A servomechanism control system comprising:
- means for generating a command signal representing a desired physical quantity;
- means for actuating a driven element to output said physical quantity in accordance with said command signal;
- means for measuring said output physical quantity and comparing it with said command signal;
- means for generating an error signal representing the difference between said command signal and said meaured output; and
- means for providing said error signal in a feedback loop having a variable gain to actuate said driven element in a fashion so as to reduce said error signal to a zero value,
- wherein said variable gain is provided in accordance with a function related to the absolute value of said error signal and the absolute value of the velocity of said command signal.

13. The control system of claim 12 wherein said means for providing said error signal in a feedback loop comprises a processing unit implemented in a microcontroller programmed with control software.

14. The control system of claim 12 wherein said means for providing said error signal in a feedback loop comprises a processing unit implemented in an analog signal processor.

* * * * *